US006962443B2

United States Patent
Gomyo

(10) Patent No.: US 6,962,443 B2
(45) Date of Patent: Nov. 8, 2005

(54) FLUID DYNAMIC PRESSURE BEARING APPARATUS

(75) Inventor: Masato Gomyo, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 27 days.

(21) Appl. No.: 10/090,419

(22) Filed: Feb. 28, 2002

(65) Prior Publication Data

US 2002/0122609 A1 Sep. 5, 2002

(30) Foreign Application Priority Data

Mar. 5, 2001 (JP) .............................. 2001-060761

(51) Int. Cl.[7] .............................................. F16C 17/10
(52) U.S. Cl. ...................................... 384/123; 384/107
(58) Field of Search ................................. 384/107, 121, 384/123

(56) References Cited

U.S. PATENT DOCUMENTS 5,357,163 A * 10/1994 Minakuchi et al. ............ 310/90
6,132,094 A * 10/2000 Cornelison et al. ......... 384/121

FOREIGN PATENT DOCUMENTS

| DE | 39 01 265 A1 | * | 7/1990 |
| JP | 9-158744 | * | 6/1997 |
| JP | 11-013748 | | 1/1999 |
| JP | P2001-295833 A | * | 10/2001 |
| JP | 2002-061637 | | 2/2002 |

* cited by examiner

Primary Examiner—William C. Joyce
(74) Attorney, Agent, or Firm—Hogan & Hartson, LLP

(57) ABSTRACT

A fluid dynamic pressure bearing apparatus includes a radial dynamic pressure bearing formed in a gap portion between a bearing member and a shaft member. The apparatus also includes a thrust dynamic pressure bearing having a first thrust bearing portion formed between a top surface of the thrust plate and a first facing member opposing thereto in the axial direction and a second thrust bearing portion formed between a bottom surface of the thrust plate and a second facing member opposing thereto in an axial direction. Dynamic pressure generating grooves are formed on the radial dynamic pressure bearing and the thrust dynamic pressure bearing. The shaft member and the bearing member are rotated together as a rotation member, such that the rotation member is supported in a position such that a gap space L1 of the first thrust bearing portion is larger than a gap space L2 of the second thrust bearing portion and the depth of the dynamic pressure generating grooves where the gap space is smaller is formed shallower than that where the gap space is larger.

7 Claims, 7 Drawing Sheets

FLUID DYNAMIC PRESSURE BEARING APPARATUS

DETAILED DESCRIPTION OF THE INVENTION

1. Field of the Invention

The present invention relates to a fluid dynamic pressure bearing apparatus and more particularly, to a fluid dynamic pressure bearing apparatus having a rotating shaft member and a bearing sleeve member wherein the rotating shaft member and the bearing sleeve member are supported in a relatively rotatable state by a dynamic pressure generated from a lubrication fluid disposed between a dynamic pressure surface of the rotating shaft member and a dynamic pressure surface of the bearing sleeve member.

2. Related Art

In recent years, various fluid bearing apparatuses have been proposed for rotatably supporting a rotator body such as magnetic disks, optical disks, or polygon mirrors in a high-speed rotation.

For example, a dynamic pressure bearing apparatus is used in a spindle motor such as a hard disk drive (HDD) shown in FIG. 7. A bearing sleeve 13 acts as a bearing member and is mounted for supporting a rotating shaft member 21. A dynamic pressure surface provided on an outer peripheral surface of the rotating shaft member 21 and a dynamic pressure surface provided on the internal circumference of the bearing sleeve 13 radially face each other in proximity to form a narrow gap. A radial dynamic pressure bearing RB is formed by filling a lubricating fluid such as oil or air within the narrow gap. In addition, dynamic pressure surfaces provided on both sides of a thrust plate 23 fixed to the rotating shaft member 21 and a dynamic pressure surface of the bearing sleeve 13 or a dynamic pressure surface of a counter plate 16 mounted in an opening portion of the bearing sleeve 13 face each other in proximity to form a narrow gap in an axial direction. The lubricating fluid is filled to form thrust dynamic pressure bearings SBa and SBb.

At least one surface of the dynamic pressure surfaces of the radial dynamic pressure bearing RB and the thrust dynamic pressure bearings SBa or SBb is provided with a fluid pressuring means such as dynamic pressure generating grooves. A lubrication fluid is pressurized by means of a pumping operation created by the dynamic pressure generating grooves (not shown) to generate a dynamic pressure. Due to the generated dynamic pressure, a rotating member is rotatably supported with respect to a stationary member in an elevated state in a radial and a thrust direction, respectively.

In such a fluid bearing device described above, when the rotating member rotates, the rotating member moves in a non-contact position with respect to the stationary fixed member by the lubrication fluid. When the rotating member stops rotating, one side of the two thrust bearing portions comes in contact with the rotating member and the fixed member. For example, in a spindle motor for HDDs, after a hard disk supported by the rotating member rotates at a particular speed, a recording/reproducing head moves over a disk via a guide member and recording/reproducing is performed in a non-contact state. When the motor stops, the rotating member moves downward from an elevated position to a contacting position due to gravitational forces.

While this operation is performed, the hard disk is separated from the guide member having the recording/reproducing magnetic head so that the hard disk does not come into contact with the guide member. However, when the motor is placed in an upside down position or an extremely large shock is added to the motor from the outside, the rotating member becomes displaced to a larger extent than the elevated height and the hard disk may come into contact with the guide member, which damages the disk and/or the guide member.

In order to solve this problem, a motor having a magnetic plate is attached to the fixed member so as to face a motor drive magnet provided on the rotor. The magnetic plate and the motor drive magnet are magnetically attracted to each other by the magnetic attraction force of the drive magnet. As a result, the rotating member is attracted towards the fixed member.

However, the gap dimension between the magnetic plate and the motor drive magnet varies according to the assembling process of the motor or errors in the dimensions of various component parts. Thus, the magnetic attraction force also varies. The variation of the magnetic attraction force results in a fluctuation of the spaces of the thrust dynamic pressure bearings SBa and SBb. Hence, the required thrust dynamic pressure may not be obtained. In addition, when the gap space of the thrust dynamic pressure bearing is made smaller due to a stronger magnetic attraction force during rotation, the viscosity of the lubrication fluid increases and a loss of torque in the motor also increases.

Generally, the amount a bearing wears is proportional to the product of the rotational speed and the contacting time of the rotating member. Therefore, the amount the bearing wears can be reduced by making the rotating member elevate even at a low speed of rotation such as when the motor first starts. However, when the rotating member and the fixed member are magnetically attracted to each other, the needed time for elevating the rotating member will increase because it is necessary to generate a force of dynamic pressure greater than the magnetic attraction force. That is, the time both members are in contact with each other increases and this causes the bearing to wear down.

The present invention provides a fluid dynamic pressure bearing apparatus with a high reliability, wherein the restrictions as to the position of the motor in use is eliminated. The present invention also provides a fluid dynamic pressure bearing apparatus wherein a required dynamic pressure can be generated readily in a thrust dynamic pressure bearing and the wearing of the thrust dynamic pressure bearing is reduced.

SUMMARY OF THE INVENTION

A fluid dynamic pressure bearing apparatus includes a radial dynamic pressure bearing formed in a gap portion between a bearing member and a shaft member. The apparatus also includes a thrust dynamic pressure bearing having a first thrust bearing portion formed between a top surface of the thrust plate and a first facing member opposing thereto in the axial direction and a second thrust bearing portion formed between a bottom surface of the thrust plate and a second facing member opposing thereto in an axial direction. Dynamic pressure generating grooves are formed on the radial dynamic pressure bearing and the thrust dynamic pressure bearing. The shaft member and the bearing member are rotated together as a rotation member, such that the rotation member is supported in a position that a gap space L1 of the first thrust bearing portion is larger than a gap space L2 of the second thrust bearing portion and the depth of the dynamic pressure generating grooves where the gap space is smaller is formed shallower than that where the gap space is larger.

In this configuration, the shallower depth of the thrust dynamic pressure generating grooves generates larger dynamic pressure at a low speed of rotation. As a result, the rotating member is able to elevate from the fixed member in the thrust bearing portion even at a low speed of rotation such that the wearing of the contact sliding of both members is decreased. Accordingly, a fluid dynamic pressure bearing which is superior to its durability is obtained and a larger thrust dynamic pressure is obtained even in the thrust bearing portion in which the opposing gap space is small.

In accordance with one embodiment of the present invention, the depth of the dynamic pressure generating grooves in the thrust bearing portion in which the gap space is smaller is determined in such a manner that the coefficient of elasticity of the thrust bearing portion is set to be generally at a maximum value. Therefore, a large bearing rigidity is obtained.

For this purpose, it is preferable to establish the depth of the dynamic pressure generating grooves in the dimension of 0.8 times to 2.8 times of its gap space.

In accordance with one embodiment of the present invention, each of the depths of the dynamic pressure generating grooves in the first and the second thrust bearing portions is determined in such a manner that each of the coefficients of elasticity of the thrust bearing portions is respectively set to be a generally maximum value. Therefore, a large bearing rigidity is obtained and further, a desired coefficient of elasticity can be obtained even if the real peak value of the coefficient of elasticity is displaced by residual stress or distortion produced in the thrust plate.

In accordance with one embodiment of the present invention, the second facing member is formed from a material of greater hardness than that of the first facing member and a biasing means is provided for urging the thrust plate to elevate from the second thrust bearing portion.

In this configuration, the thrust plate elevates from the side of the material of greater hardness and thus the wear of the thrust dynamic pressure bearing is restrained, regardless of the position of the motor in use, and the reliability of the bearing is improved.

Other features and advantages of the invention will be apparent from the following detailed description, taken in conjunction with the accompanying drawings that illustrate, by way of example, various features of embodiments of the present invention.

PREFERRED EMBODIMENTS OF THE INVENTION

Various embodiments of the present invention will be explained below. First, an overall structure of a hard disk drive (HDD) device to which the present invention may be applied will be explained in reference to the accompanying drawings.

Figure 1:
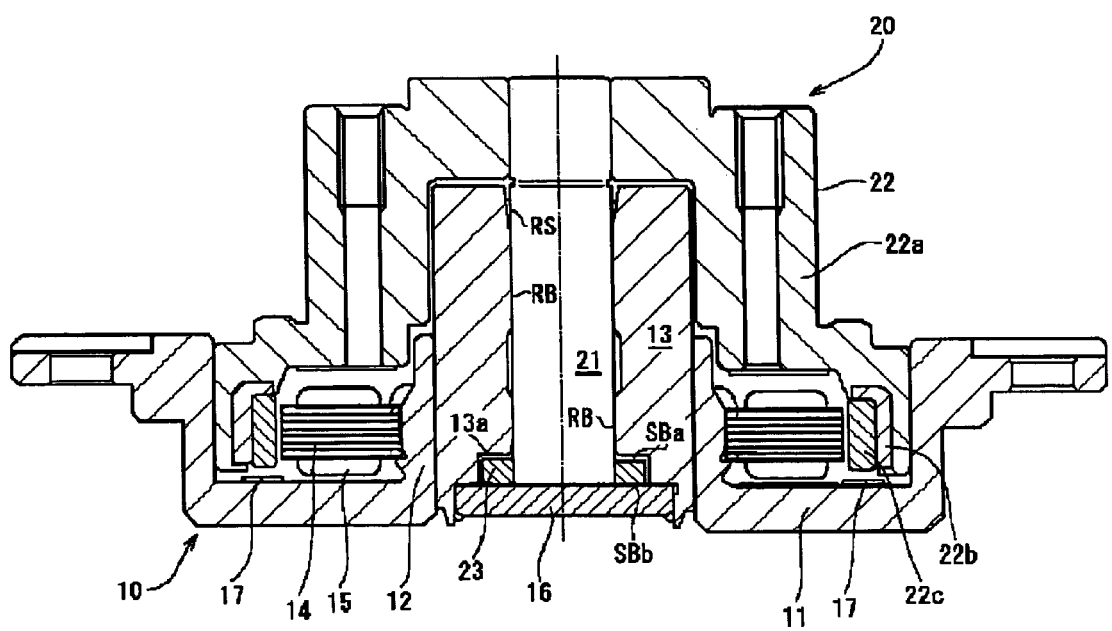
FIG. 1 is a sectional view of a spindle motor provided with a fluid dynamic pressure bearing apparatus according to an embodiment of the present invention.

A shaft rotation-type spindle motor for a HDD shown in FIG. 1 generally includes a stator assembly 10, which is a fixed member, and a rotor assembly 20, which is a rotating member assembled on top of the stator assembly 10. The stator assembly 10 has a fixed frame 11 screwed onto a fixed base or chassis of the drive apparatus (not shown). The fixed frame 11 is formed of an aluminum metal material to reduce its weight. A cylindrical sleeve holding portion 12 is formed upright in the generally center area of the fixed frame 11. A bearing sleeve 13 in a hollow cylinder shape, which is a fixed bearing member, is attached to an inner circumference of the bearing holder 12 and joined to the bearing holder 12 through press fit or shrink fit. The bearing sleeve 13 is formed from a copper alloy material, such as phosphorous bronze, in order to facilitate the machining of holes with small diameter.

On the outer circumference mounting surface of the bearing holder 12 is mounted a stator core 14 including a stacked layered body of electromagnetic steel plates. A drive coil 15 is wound on each of the salient pole sections provided on the stator core 14.

A bearing hole (not shown) is provided in the center of the bearing sleeve 13, and a part of the rotor assembly 20, which is a rotating shaft 21, is inserted inside the bearing hole. The rotating shaft 21 in the present embodiment is formed from stainless steel. This means that the bearing sleeve 13 which is a bearing member, is formed from a material with more resilience than the rotating shaft 21, which is a shaft member. On the inner circumference surface of the bearing hole of the bearing sleeve 13 is formed a dynamic pressure surface, which is positioned to face in the radial direction a dynamic pressure surface formed on the outer circumference surface of the rotating shaft 21, such that a radial dynamic pressure bearing section RB is created in minute bearing gap between the dynamic pressure surfaces. More specifically, the dynamic pressure surface on the bearing sleeve 13 side and the dynamic pressure surface on the rotating shaft 21 side in the radial dynamic pressure bearing section RB face each other across a minute gap of a few $\mu$m; this minute gap forms a bearing space into which lubricating fluid is continuously charged in the axial direction. The lubricating fluid is, for example, lubricating oil such as from an ester series or a poly-α-olefin series, magnetic fluid, or air.

Radial dynamic pressure generating grooves (not shown) in a herringbone shape, for example, are provided on at least one of the dynamic pressure surfaces on the bearing sleeve 13 and the rotating shaft 21 in two blocks of concave ring shapes separated in the axial direction. When the rotation takes place, the pumping action of the grooves pressurizes the lubricating fluid to generate a dynamic pressure, so that the rotating shaft 21 and the rotating hub 22 are shaft-supported in the radial direction.

A capillary seal portion RS is provided at the top of the bearing space in the figure that forms the radial dynamic pressure bearing section RB. The capillary sealing section RS is structured by an angle surface formed on the rotating shaft 21 or on the bearing sleeve 13 that gradually widens the bearing gaps towards the outside of the bearing, and has a gap dimension of about 20 $\mu$m to about 300 $\mu$m, for example. The surface level of the lubricating fluid is positioned within the capillary sealing section RS in both the motor rotation and stop states.

A rotating hub 22 that along with the rotating shaft 21 forms the rotor assembly 20 is formed from a generally cup-shaped member made of an aluminum metal, so that a recording medium such as a magnetic disk (not shown) can be mounted on the rotating hub 22. In the center area of the rotating hub 22 is provided a joint hole 22d, which is joined in a unitary fashion through press fit or shrink fit with the top area of the rotating shaft 21.

The rotating hub 22 has a generally cylinder-shaped body section 22a on whose outer circumference a disk is mounted, and on the bottom inner circumference wall of the body section 22a is mounted via a back yoke 22b and a ring-shaped drive magnet 22c. The magnet 22c is positioned to face the outer circumference end surface of the stator core 14.

At the bottom end of the rotating shaft 21 is fixed a disk-shaped thrust plate 23. The thrust plate 23 is contained in a cylinder-shaped concave recess formed at the bottom center of the bearing sleeve 13. In the recess of the bearing sleeve 13, the dynamic pressure surface provided on the top surface of the thrust plate 23 faces in close proximity the dynamic pressure surface provided on the bearing sleeve 13. A dynamic pressure generating groove is formed on at least one of the two facing dynamic pressure surfaces, and a top thrust dynamic pressure bearing section Sba is formed in the gap between the dynamic pressure surfaces of the thrust plate 23 and the bearing sleeve 13 facing each other.

In close proximity to the bottom dynamic pressure surface of the thrust plate 23 is a counter plate 16, which is formed from a disk-shaped member with a relatively large diameter. The counter plate 16 closes off the bottom opening area of the bearing sleeve 13. A dynamic pressure generating groove is also formed between the dynamic pressure surface provided at the top of the counter plate 16 and the dynamic pressure surface on the bottom of the thrust plate 23, which forms a bottom thrust dynamic pressure bearing section SBb.

The two dynamic pressure surfaces of the thrust plate 23 and the dynamic pressure surface of the bearing sleeve 13 and of the counter plate 16 that faces them together constitute a set of thrust dynamic pressure bearing sections SBa and SBb next to each other in the axial direction and are in each case arranged so that the opposing dynamic pressure surfaces face each other across a minute gap of a few $\mu$m; and the lubricating fluid is charged continuously into the minute gaps in the axial direction via a path provided on the outer circumference of the thrust plate 23.

Furthermore, normal herringbone-shaped thrust dynamic pressure generating grooves in a ring shape are provided on at least one of the dynamic pressure surfaces of the thrust plate 23 and that of the bearing sleeve 13, and on at least one of the dynamic pressure surfaces of the thrust plate 23 and that of the counter plate 16. As a result, when rotation takes place, the pumping action of the thrust dynamic pressure generating grooves pressurizes the lubricating fluid to generate dynamic pressure and the rotating shaft 21 and the rotating hub 22 are supported in the thrust direction. A further option for the thrust dynamic pressure generating grooves is that they may be formed on the dynamic pressure surface of the bearing sleeve 13 at the top thrust dynamic pressure bearing section SBa and may be formed on the dynamic pressure surface of the counter plate 16 at the bottom thrust pressure bearing section SBb.

In the spindle motor shown in FIG. 1, a ring shaped magnetic attraction plate 17 made of magnetic material is mounted on fixed frame 11. The magnetic attraction plate 17 is fixed on the fixed frame 11 to face onto the bottom surface of the drive magnet 22c and therefore includes a biasing means. The magnetic attraction plate 17 attracts the rotor assembly 20 towards the frame 11 by a magnetic attraction force between the drive magnet 22c and the magnetic attraction plate 17. The magnitude of the force is larger than the gravitational force applied on the entire rotor assembly 20 when the motor is placed upside down.

Therefore, the magnetic attraction plate 17 can always pull the rotor assembly 20 towards the fixed frame 11, even if the motor is placed upside down and the gravitational force is applied to the rotor assembly 20. Thus, when the rotor assembly 20 does not rotate, the counter plate 16 contacts with the bottom surface of the thrust plate 23 of the bottom thrust dynamic pressure bearing section SBb.

When a current is applied to the drive coil 15 and the rotor assembly 20 rotates by the electromagnetic action between the stator core 14 and the drive magnet 22c, the thrust plate 23 elevates from the counter plate 16. When rotation is suspended, the thrust plate 23 returns to be in contact with the counter plate 16 again.

In addition, regarding the top thrust dynamic pressure bearing section SBa which includes the upper surface of the thrust plate 23 and the bottom surface of the bearing sleeve 13, the bottom surface of the bearing sleeve 13 does not form a flat surface because the surface is provided with cut streaks. Furthermore, the bearing sleeve 13 is formed from a comparatively soft metal such as copper or copper alloy. This is for easy workability of the top thrust dynamic pressure bearing section SBa as well as radial dynamic pressure generation grooves formed on its internal circumference surface.

On the other hand, regarding the bottom dynamic pressure bearing section SBb which includes the under surface of the thrust plate 23 and the upper surface of the counter plate 16, the upper surface of the counter plate 16 has a flat surface which is achieved by lapping work or polishing work. Further, the counter plate 16 is formed of a hard material which is a heat-treated rustless steel.

As described above, when the rotor assembly 20 stops rotating, the bottom face of the thrust plate 23 remains in contact with the counter plate 16 of the bottom thrust dynamic pressure bearing surface SBb. In a low-speed rotating state such as just after starting or before stopping, both members remain slightly in contact with each other. However, since the upper surface of the counter plate 16 is flat and hard, the wearing of the dynamic pressure surfaces of the counter plate 16 and the thrust plate 23 can be greatly reduced.

Figure 3:
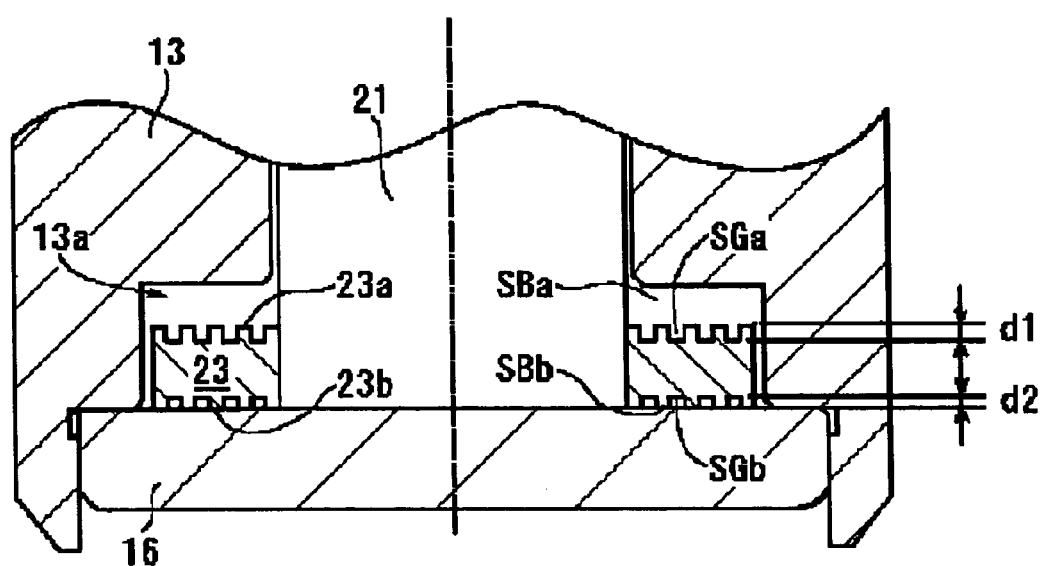
FIG. 3 is a partially cross-sectional view of the spindle motor provided with a fluid dynamic pressure bearing apparatus in a suspended state according to an embodiment of the present invention.
Figure 4:
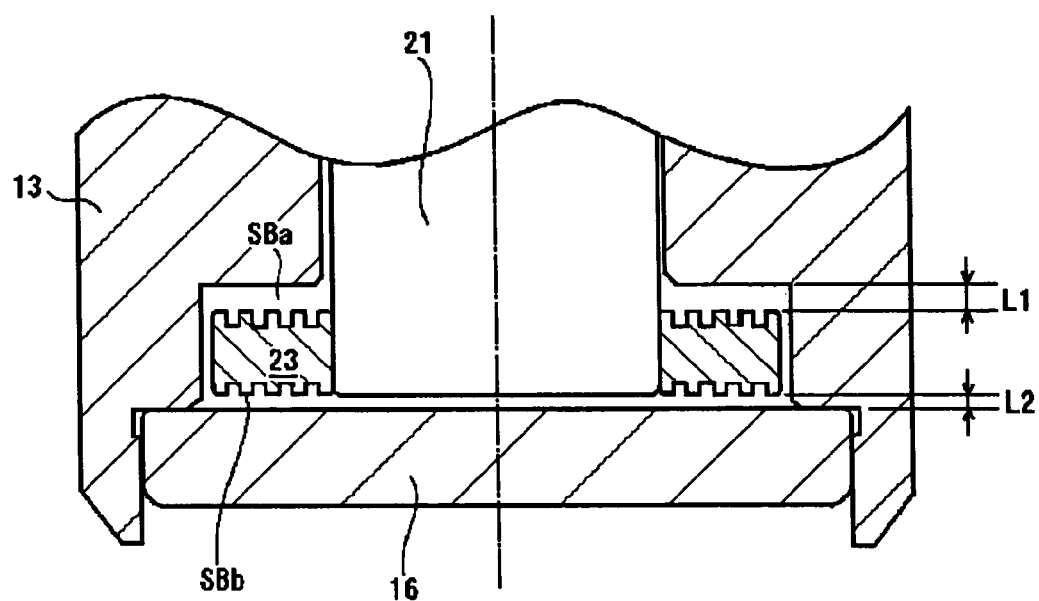
FIG. 4 is a partially cross-sectional view of the spindle motor provided with a fluid dynamic pressure bearing apparatus in a rotation state according to an embodiment of the present invention.

The structure of the thrust dynamic pressure bearing according to an embodiment of the present invention is described below in detail with reference to FIG. 3 and FIG. 4. FIG. 3 is a sectional view of a spindle motor for a HDD in a stopped state in an embodiment of the present invention. FIG. 4 is a sectional view of the motor in a rotating state.

In FIG. 3, the thrust plate 23 is fixed to one end of the rotating shaft 21 and is provided within the recessed portion 13a formed within the bearing sleeve 13. Thrust dynamic pressure generating grooves SGa having a depth d1 are formed on the upper surface 23a of the thrust plate 23. The upper surface 23a faces onto a dynamic pressure surface of the bearing sleeve 13 (the first facing member) and the top thrust dynamic pressure bearing section SBa is formed by the bearing gap space between the upper surface 23a and the bearing sleeve 13. Also, thrust dynamic pressure generating grooves SGb having a depth d2 are formed on the bottom surface 23b of the thrust plate 23. The bottom surface 23b faces onto a dynamic pressure surface of the counter plate 16 (the second facing member) and the bottom thrust dynamic pressure bearing surface SBb is formed by the bearing gap space between the bottom surface 23b and the counter plate 16. When the motor stops, the bottom surface 23b of the thrust plate 23 and the dynamic pressure surface of the counter plate 16 make contact by a force of the biasing means including that of the magnetic attraction plate 17.

The depth d1 of the thrust dynamic pressure generating grooves SGa formed on the upper surface 23a and the depth d2 of the thrust dynamic pressure generating grooves SGb formed on the bottom surface 23b are so determined as to satisfy the relationship of d1>d2, that is, the depth d1 is deeper than the depth d2 in the thrust plate 23.

When the rotating shaft 21 and the thrust plate 23 start rotating, the dynamic pressure in the bottom thrust dynamic pressure bearing surface SBb increases to make the thrust plate 23 elevate. At a specified number of rotations, the dynamic pressure of the bottom thrust dynamic pressure bearing surface SBb and the dynamic pressure of the top thrust dynamic pressure bearing surface SBa balance each other so that the thrust plate 23 will continue to rotate in a state that the thrust plate 23 maintains a specified elevation as shown in FIG. 4.

In this case, the relationship between the gap dimension L1 in the top thrust dynamic pressure bearing section SBa and the gap dimension L2 in the bottom thrust dynamic pressure bearing section SBb is as follows; L1>L2, that is, the rotation is performed in a state that the gap L2 is smaller than the gap L1. This is because the rotor assembly 20 is attached to the frame 11 by the biasing means described above.

Figure 5:
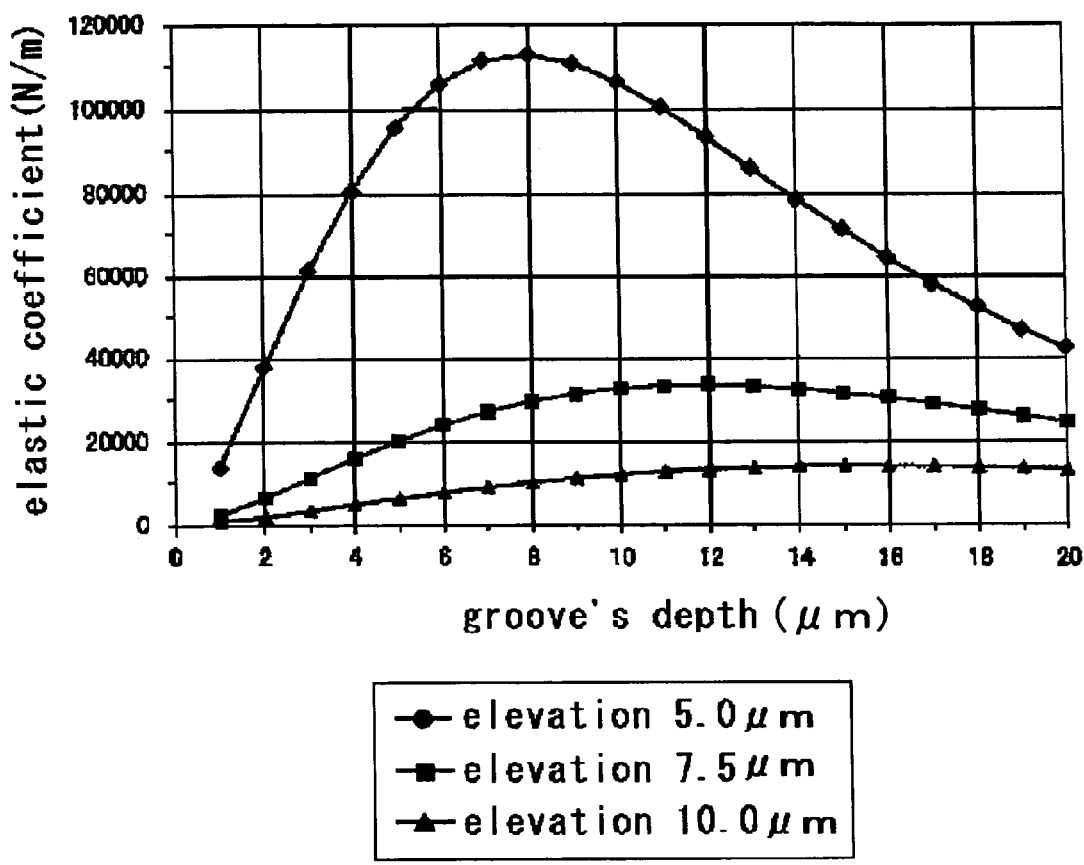
FIG. 5 is a schematic illustration which shows a simulation result of the coefficient of elasticity in the thrust dynamic pressure bearing with respect to the depth of the thrust dynamic pressure generating groove SG as a parameter of the floating amount of the thrust plate.

FIG. 5 is a schematic illustration which shows the simulation results of the coefficient of elasticity in the thrust dynamic pressure bearing, that is, the magnitude of the repulsive force by the dynamic pressure with respect to the depth of the thrust dynamic pressure generating groove SG as a parameter of the elevated amount of the thrust plate 23. In FIG. 5, three cases of the elevated amount (gap dimension) of the thrust plate 23 as 5.0 μm, 7.5 μm, and 10.0 μm are plotted to show how the coefficient of elasticity in the thrust dynamic pressure bearing varies depending on the depth of the thrust dynamic pressure generating groove SG.

As a result, when the groove's depth is progressively increased by 1 μm with the elevated amount or gap dimension maintaining a constant value of 5.0 μm, the coefficient of elasticity rapidly increases within the range of about 8 μm of the depth of the dynamic pressure generating groove and the peak value of the coefficient of elasticity reaches about 110,000 N/m.

Especially, when the groove's depth is in the range of 1 times to 2 times of the elevated amount (5.0 μm), that is, the groove's depth is in the range of about 5 μm to 10 μm, a sufficient coefficient of elasticity around 90% of the coefficient of elasticity of the peak can be obtained. In addition, when the groove's depth is in the range of about 0.8 times to 2.8 times of the elevated amount (5.0 μm), that is, the groove's depth is in the range of about 4 μm to 14 μm, the coefficient of elasticity reaches a value larger than 70% of the peak. On the other hand, when the depth of the dynamic pressure generating groove is larger than about 8 μm, the coefficient of elasticity decreases gradually, and when the groove's depth is about 20 μm, the coefficient of elasticity reaches approximately one-third of the peak.

Next, when the elevated amount is a constant value of 7.5 μm and the depth of the dynamic pressure generating groove is progressively increased, the coefficient of elasticity increases gradually up to around 12 μm and the peak value of the coefficient of elasticity reaches about 33,000 N/m. That is a similar result to the case of the elevated amount of 5.0 μm. When the groove's depth is in the range of about one times to two times of the elevated amount, that is, when the groove's depth is in the range of about 7.5 μm to 15 μm, the coefficient of elasticity is reached to a value of about 90% of the peak. Also, when the groove's depth is in the range of about 0.8 times to 2.8 times of the elevated amount, that is, the groove's depth is in the range of 6 μm to 21 μm, the coefficient of elasticity reaches to a value larger than 70% of the peak. The curve of the elevated amount of 7.5 μm in FIG. 5 varies more gradually than the curve of 5.0 μm, and after the peak of the coefficient of elasticity, the coefficient of elasticity decreases according to the increase of the groove's depth.

When the elevated amount is a constant value of 10.0 μm and the depth of the dynamic pressure generating groove is progressively increased, the coefficient of elasticity increases gradually up to around 16 μm and the peak value of the coefficient of elasticity reaches about 15,000 N/m. Similar to the case when the elevated amount is 5.0 μm, when the groove's depth is in the range of about one times to two times of the elevated amount, that is, when the groove's depth is in the range of about 10 μm to 20 μm, the coefficient of elasticity reaches a value about 90% of the peak. When the groove's depth is in the range of about 0.8 times to 2.8 times of the elevated amount, that is, when the groove's depth is in the range of about 8 μm to 28 μm, the coefficient of elasticity reaches a value larger than 70% of the peak. The curve of the elevated amount of 10.0 μm varies more gradually than the curve of 7.5 μm in the figure, and after the peak of the coefficient of elasticity, the coefficient of elasticity decreases slightly according to the increase of the groove's depth.

From the results described above in FIG. 5, it is understood that when the amount of the thrust plate's elevation is smaller, the coefficient of elasticity is larger with relatively smaller depths of the dynamic pressure generating grooves. On the otherhand, when the amount of the thrust plate's elevation is larger, the coefficient of elasticity is larger with relatively larger depths of the dynamic pressure generating grooves.

As described above and as illustrated in FIG. 4, the thrust dynamic pressure bearing is structured in such a manner that the gap dimension L2 of the bottom thrust dynamic pressure bearing section SBb is narrower than the gap dimension L1 of the top thrust dynamic pressure bearing section SBa in a rated rotation state. Further, a larger coefficient of elasticity and a bearing rigidity can be achieved by setting the depth of a dynamic pressure generating groove in the smaller elevation amount side of the thrust plate 23 (the bottom thrust dynamic pressure bearing section SBb) smaller than the depth in the larger elevation amount side. At this time, the depth of the dynamic pressure generating groove is preferably in the range of about 0.8 times to 2.8 times of the elevation amount (gap dimension) of the thrust plate 23 in a rated number of rotations. Further, when the depth of the dynamic pressure generating groove is set in the range of about one times to two times of the floating amount (gap dimension), the coefficient of elasticity can be achieved near the peak coefficient of elasticity in the bottom thrust dynamic pressure bearing section SBb.

On the other hand, a larger coefficient of elasticity and a bearing rigidity can be achieved by setting the depth of a dynamic pressure generating groove in the larger elevation amount side of the thrust plate 23 (the top thrust dynamic pressure bearing section SBa) larger than the depth in the smaller elevated amount side. At this time, the depth of the dynamic pressure generating groove is desirably in the range of about 0.8 times to 2.8 times of the elevated amount of the thrust plate 23 in a rated number of rotations. Further, when the depth of the dynamic pressure generating groove is set in the range of about one times to two times of the elevated amount, the coefficient of elasticity can be achieved near the peak coefficient of elasticity in the top thrust dynamic pressure bearing section SBa.

As described above, when the coefficient of elasticity is set to be near to the maximum value of the coefficient of elasticity, close to the desired value of the coefficient of elasticity can be obtained in each of the thrust bearing portions SBa and SBb respectively, even if the real value of the coefficient of elasticity is shifted a little from the peak value by the residual stress or the distortion applied to the thrust plate 23 when the dynamic pressure generating grooves are formed on the thrust plate 23 or when the thrust plate 23 is fitted to the rotor shaft 21. Therefore, when the rotating member begins to rotate, a dynamic pressure with a high coefficient of elasticity occurs even at a slow speed and the thrust plate 23 begins to elevate. As a result, a sliding period with the counter plate 16 can be reduced to a short time and wear in the thrust dynamic pressure bearing can be reduced. Consequently, a fluid dynamic pressure bearing apparatus having a high reliability can be provided.

Figure 6:
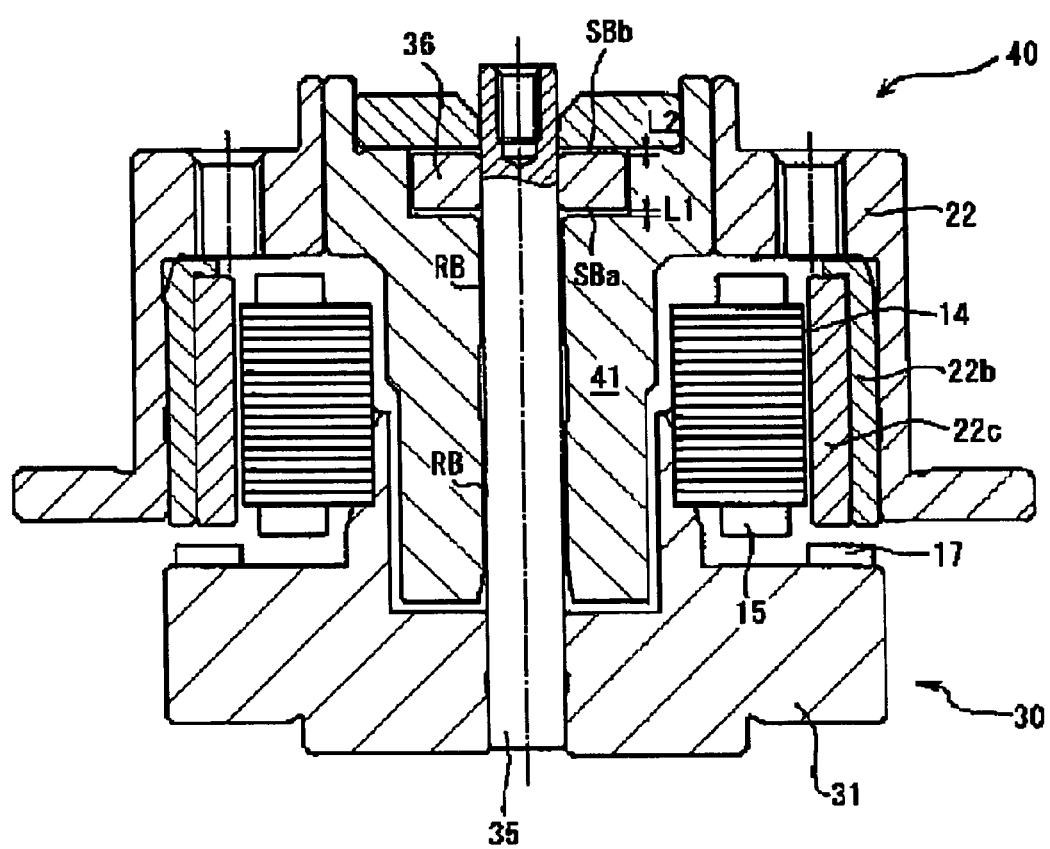
FIG. 6 is a cross-sectional view of a fluid dynamic pressure bearing apparatus according to another embodiment of the present invention.
Figure 7:
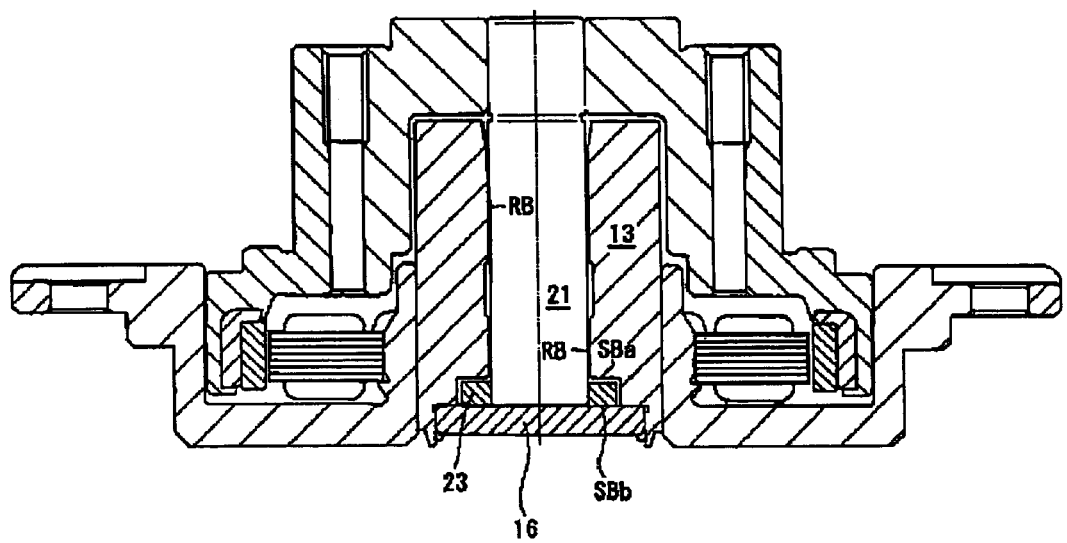
FIG. 7 is a sectional view of a conventional fluid bearing apparatus.

Next, another embodiment according to the present invention is described with reference to FIG. 6, which is a sectional view of a shaft fixed-type HDD spindle motor. In FIG. 6, the same reference symbols are used for the same members as the shaft rotation-type HDD spindle motor shown in FIG. 1, and its description is omitted.

The HDD spindle motor shown in FIG. 6 includes a stator assembly 30 as a fixed member and a rotor assembly 40 as a rotation member which is rotatably supported to the stator assembly 30. The stator assembly 30 is provided with a frame 31 fixed to a main chassis of the drive apparatus (not shown) by a screw, etc. A fixed shaft 35 as a shaft member is mounted in a center area of the frame 31, and its upper end portion is provided with a tapped hole for a screw to the drive chassis. This construction is known as a motor where both ends of the shaft are fixed.

A cup-shaped hub 22 formed unitarily with a bearing sleeve 41 is rotatably mounted to an outer periphery of the fixed shaft 35 via the bearing sleeve 41 as a bearing member, including the rotor assembly 40. A ring-shaped drive magnet 22c is mounted on an inner wall surface of the hub 22 via a back yoke 22b.

In an internal peripheral surface of a center hole of the bearing sleeve 41, a pair of radial bearing portions are formed apart from each other in an axial direction. These radial bearing portions face opposite to an outer peripheral surface of the fixed shaft 35. A pair of radial dynamic pressure bearings RB are provided between the dynamic pressure surfaces which are formed on the internal peripheral surface of these bearing portions of the bearing sleeve 41 and the dynamic pressure surface formed on the outer peripheral surface of the fixed shaft 35. The hub 22 is rotatably supported to the fixed shaft 35 in a radial direction by these radial dynamic pressure bearings RB.

A thrust plate 36 is fixed to the upper end portion of the shaft 35 and is disposed in a recessed portion formed in an upper central part of the bearing sleeve 41. The top thrust dynamic pressure bearing section SBa is formed between a dynamic pressure surface, an upper surface of the bearing sleeve 41 as a first facing member and a dynamic pressure surface provided on a bottom surface of the thrust plate 36 in a proximate state in an axial direction.

In addition, the counter plate 44 (the second facing member) having a larger diameter than the thrust plate 36 is mounted in an opening portion of the bearing sleeve 41 so as to oppose a dynamic pressure surface of the upper side of the thrust plate 36 in a proximate state. The bottom thrust dynamic pressure bearing section SBb is positioned between the dynamic pressure surface provided on an under surface of the counter plate 44 and the dynamic pressure surface provided on the upper surface of the thrust plate 36. A lubricating fluid such as lubricating oil, magnetic fluid, or air is filled into the top and the bottom thrust dynamic pressure bearing surfaces SBa and SBb and the radial dynamic pressure bearings RB.

In a spindle motor shown in FIG. 6, a biasing means, such as a ring shaped magnetic attraction plate 17 made of a magnetic material, is fixed on the frame 31 so as to oppose a bottom end surface of the drive magnet 22c. The magnetic attraction plate 17 attracts the rotor assembly 40 to the side of the frame 31 with the magnetic attraction force that is larger than the magnitude of the gravitational force relating to the rotor assembly 40. Therefore, even when the motor is used in an upside down manner, the magnetic attraction plate 17 still attracts the rotor assembly 40 to the frame 31 given the gravity applied to the rotor assembly 40. Thus, when the rotor assembly 40 does not rotate, the upper surface of the thrust plate 36 and the bottom surface of the counter plate 44 of the bottom thrust dynamic pressure bearing section SBb are in contact with each other.

In a shaft fixed-type HDD spindle motor described above, the counter plate 44 and the bearing sleeve 41 are formed to rotate with respect to the thrust plate 36 attached to the fixed shaft 35. To the contrary, in a shaft rotation-type HDD spindle motor described above, the thrust plate 23 is fixed to the rotating shaft 21 which rotates with respect to the bearing sleeve 13, and the counter plate 16 is mounted to the fixed member. These two embodiments differ from each other in the fixed member and the rotating member, but they are similar in basic construction according to the present invention.

That is, in a shaft fixed-type HDD spindle motor shown in FIG. 6, when the rotor assembly 40 rotates with respect to the stator assembly 30 in a rated speed, the gap dimension L2 of the bottom thrust dynamic pressure bearing section SBb is constructed so as to be smaller than the gap dimension L1 of the top thrust dynamic pressure bearing section SBa. The depth of the dynamic pressure generating grooves in the bottom thrust dynamic pressure bearing section SBb is formed shallower than the depth of the dynamic pressure generating grooves in the top thrust dynamic pressure bearing section SBa.

In addition, the depth of the dynamic pressure generating grooves in the bottom thrust dynamic pressure bearing section SBb, of which the gap dimension L2 is smaller than the gap dimension L1, is established so that the coefficient of elasticity of the bottom thrust dynamic pressure bearing section SBb has generally the greatest value. More specifically, the depth of the dynamic pressure generating grooves of the bottom thrust dynamic pressure bearing section SBb is established in the dimension of 0.8 times–2.8 times with respect to the gap dimension L2. For example, when the gap dimension L2, that is, the elevated amount of the thrust plate 36 in a rated rotation is 5 μm, the depth of the dynamic pressure generating grooves of the bottom thrust dynamic pressure bearing section SBb is established between 4 μm and 14 μm. More preferably, the coefficient of elasticity of near the maximum value can be obtained by setting the groove depth between 5 μm and 10 μm.

In addition, the depth of the dynamic pressure generating grooves in the top thrust dynamic pressure bearing section SBa, which is the larger side in the gap dimension, is preferably set so that the coefficient of elasticity of the top thrust dynamic pressure bearing section SBa has generally the greatest value.

In this embodiment, a magnetic attraction plate 17 is provided on the frame 31 for urging the rotation member to the frame 31. Thus, the counter plate 44 as a second facing member is formed by a material of greater hardness than the bearing sleeve 41 as a first facing member, and the thrust plate 36 can always elevate from the bottom thrust dynamic pressure bearing surface SBb. In addition, the surface roughness of the dynamic pressure surface of the counter plate 44 is formed more smoothly than the surface roughness of the dynamic pressure surface of the bearing sleeve 41.

Therefore, even when the counter plate 44 and the thrust plate 36 slide together at a slow speed of rotation such as when starting to rotate, the wear of the dynamic pressure surfaces of the counter plate 44 and the thrust plate 36 can be extremely reduced because the dynamic pressure surface of the counter plate 44 can be formed smoothly and formed by a material of greater hardness.

The embodiments of the invention are described above. However, the present invention is not limited to the embodiments described above, and many modifications can be made without departing from the subject matter of the present invention.

In the above-mentioned embodiments, for example, the thrust dynamic pressure generating grooves SG are formed on both surfaces of the thrust plate 23 and 36 in an axial direction. However, the thrust dynamic pressure generating grooves SG may be formed on the dynamic pressure surface of the bearing sleeves 13 or 41 as the first facing member, and on the dynamic pressure surface of the counter plates 16 or 44 as the second facing member in an axial direction.

Also, in the above-mentioned embodiments, the magnetic attraction plate 17 is arranged at a position so as to oppose against the drive magnet 22c as a biasing means in an axial direction. However, instead of arranging the magnetic attraction plate 17, the rotor assembly 20 or 40 may be attracted to the frame 11 or 31 by shifting a magnetic center of the drive magnet 22c with respect to a magnetic center of the stator core 14 in a reverse direction of the frame.

Figure 2:
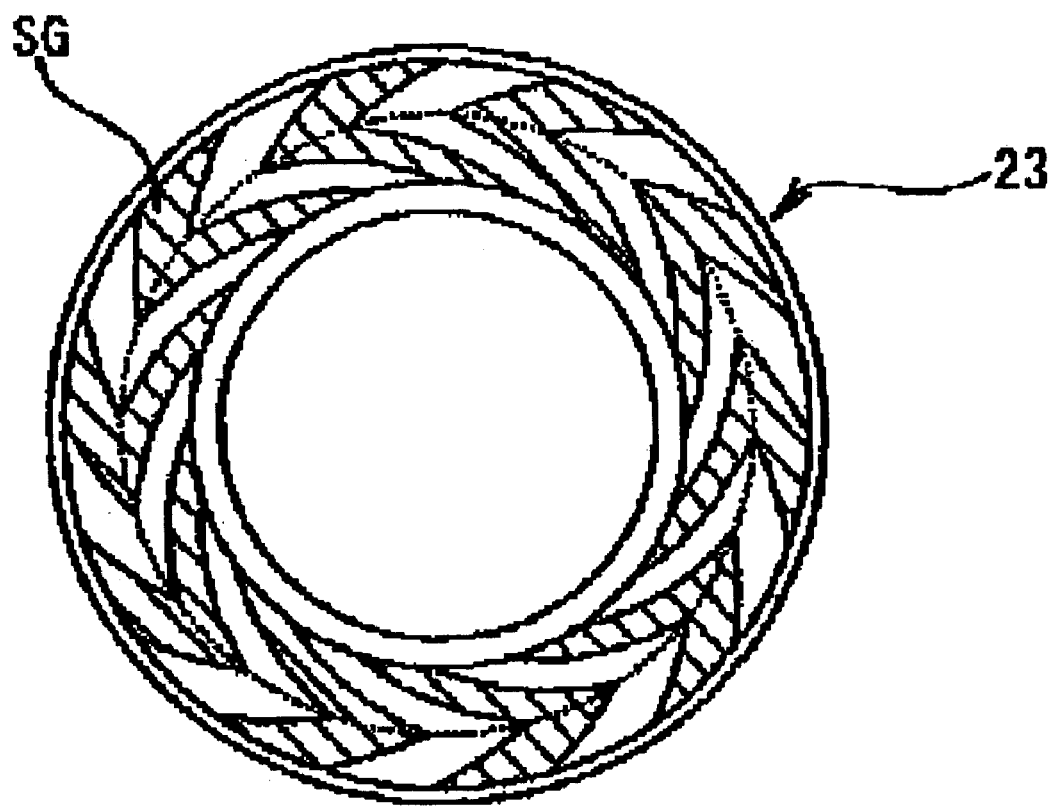
FIG. 2 is a plane explanatory view of one example of dynamic pressure generating grooves formed in a thrust plate.

In addition, the shaft member 21 or 35 and thrust plate 23 or 36 may be formed as one member. The thrust dynamic pressure generating grooves SG formed on the thrust dynamic pressure bearing SB may be configured as a shape of well-known spiral type grooves instead of the herringbone configuration grooves shown in FIG. 2.

Furthermore, the present invention can be similarly applied to motors of one side shaft fixed-type motor instead of both side shaft fixed-type motor shown in FIG. 6.

While the description above refers to particular embodiments of the invention, it will be understood that many modifications may be made without departing from the spirit thereof. The accompanying claims are intended to cover such modifications as would fall within the true scope and spirit of the present invention.

The disclosed embodiments are therefore to be considered in all respects as illustrative and not restrictive. The scope of the invention being indicated by the appended claims, rather than the foregoing description, and all changes which come within the meaning and range of equivalency of the claims are therefore intended to be embraced therein.

What is claimed is:

1. A fluid dynamic pressure bearing apparatus comprising:
a shaft;
a thrust plate fixed at one end of the shaft;
a bearing member having a bore, the thrust plate and a portion of the shaft being accommodated in the bore in a relatively rotatable manner with respect to each other;
a radial dynamic pressure bearing formed in a gap portion between a outer circumferential surface of the shaft and an inner circumferential surface of the bore confronting thereto;
a first thrust bearing portion formed between a top surface of the thrust plate and a first facing member opposed thereto in the axial direction, the first facing member being a portion of the bearing member, dynamic pressure generating grooves formed either on a top surface of the thrust plate or on the first facing member;
a second thrust bearing portion formed between a bottom surface of the thrust plate and a second facing member opposed thereto in the axial direction, the second facing member being a portion of the bearing member, dynamic pressure generating grooves formed either on a bottom surface of the thrust plate or on the second facing member, the first thrust bearing portion and the second thrust bearing portion composing a thrust dynamic pressure bearing;
lubricating fluid filling the first thrust bearing portion, the second thrust bearing portion and the radial dynamic pressure bearing; wherein:
a gap space (L1) of the first thrust bearing portion is larger than a gap space (L2) of the second thrust bearing portion during a normal rotating state;
the depth of the dynamic pressure generating grooves of the first thrust bearing portion is larger than that of the second thrust bearing portion;
the depth of the dynamic pressure generating grooves in the first bearing portion is adjusted so that the coefficient of elasticity of the first thrust bearing portion has about maximum value under a predetermined gap space of the first bearing portion (L1) and
the depth of the dynamic pressure generating grooves in the second bearing portion is adjusted so that the coefficient of elasticity of the second thrust bearing portion has about maximum value under a predetermined gap space of the second bearing portion (L2).

2. The apparatus according to claim 1, wherein the lubricating fluid is air.

3. The apparatus according to claim 1, wherein the lubricating fluid is lubricating oil.

4. The apparatus according to claim 3, wherein the depth of the dynamic pressure generating grooves of the second thrust bearing portion is in the range of about 0.8 times to about 2.8 times the gap space of the second thrust bearing portion.

5. The apparatus according to claim 1, wherein the grooves of the thrust dynamic pressure bearing are arranged in a herringbone pattern.

6. The apparatus according to claim 1, wherein the grooves of the thrust dynamic pressure bearing are arranged in a spiral pattern.

7. The apparatus according to claim 1, further comprising:
a biasing means for urging the rotation member toward the fixed member to make the rotation member elevate from the fixed member at startup, the biasing means including a magnet and a magnetic attraction plate for urging the rotation member toward the fixed member at startup; wherein:
the second facing member is formed from a material harder that than the first facing member.

* * * * *